United States Patent
Takeda

(10) Patent No.: US 6,728,374 B1
(45) Date of Patent: Apr. 27, 2004

(54) TRANSMITTER/RECEIVER COMPRISING BONE-CONDUCTION SPEAKER

(75) Inventor: Takeshi Takeda, Tokyo (JP)

(73) Assignee: Temco Japan Co., Ltd., Tokyo (JP)

( * ) Notice: Subject to any disclaimer, the term of this patent is extended or adjusted under 35 U.S.C. 154(b) by 0 days.

(21) Appl. No.: 09/744,473

(22) PCT Filed: Dec. 27, 1999

(86) PCT No.: PCT/JP99/07347

§ 371 (c)(1),
(2), (4) Date: Jan. 25, 2001

(87) PCT Pub. No.: WO00/72628

PCT Pub. Date: Nov. 30, 2000

(30) Foreign Application Priority Data

May 25, 1999 (JP) ............................................ 11-144739

(51) Int. Cl.[7] ................................................. H04M 1/00

(52) U.S. Cl. ............................. 379/433.02; 379/433.03; 379/430

(58) Field of Search ....................... 379/433.01, 433.02, 379/430, 433.03; 381/326

(56) References Cited

U.S. PATENT DOCUMENTS 4,150,262 A * 4/1979 Ono ............................ 381/326

FOREIGN PATENT DOCUMENTS

JP           07336786 A  * 12/1995  ................. 379/430

* cited by examiner

*Primary Examiner*—Jack Chiang
(74) *Attorney, Agent, or Firm*—Browdy and Neimark

(57) ABSTRACT

The object is to provide a handset for a telephone set or for a radio communication unit to enable its user to receive a communication while enjoying music through a headphone set and the like. The handset is small in size, light in weight and excellent in fittingness. Further, the handset enables its user to easily perceive a voice sound in communication even in a high-noise environment, and also enables the user to speak in a whisper without making the people around the user uncomfortable. Still further, the handset is capable of serving as a personal ornament of the user. The handset is provided with a bone conduction speaker portion 2, a microphone portion 3 and a drive circuit storage portion 4, and is capable of being connected with the telephone set or the radio communication unit. The bone conduction speaker portion 2 is capable of being disposed adjacent to any desired area of the user's face when the microphone portion 3 is disposed adjacent to the user's mouth.

7 Claims, 2 Drawing Sheets

TRANSMITTER/RECEIVER COMPRISING BONE-CONDUCTION SPEAKER

The present application is the national stage under 35 U.S.C. 371 of PCT/JP99/07347, filed 27 Dec. 27, 1999.

FIELD OF THE INVENTION

The present invention relates to a handset (i.e., transmitter/receiver) provided with a bone conduction speaker, and more particularly to the handset which is downsized by using the bone conduction speaker so as to be connected with and used together with a PHS (personal handy-phone system), a cell phone or a radio communication unit.

BACKGROUND OF THE INVENTION

As for a conventional handset for a telephone set and the like, the handset is improved in its transmitter portion by using a close-talking microphone so as to be capable of being used even in a high-noise environment, but not improved in its receiver portion in which a conventional air-conduction speaker is used without any improvement so that it is difficult for the user to catch a voice sound in the high-noise environment. Due to the presence of such difficulty of catching the voice sound, the user of the conventional handset must close one of his/her ears with his/her hand in order to try to catch the voice sound when he/she receives a communication from his/her partner in communication. The spectacle of such user's behavior has been often witnessed.

In a unit such as a cell phone or a PHS, since a microphone and a speaker of the unit are disposed in a small-sized casing, the microphone in the transmitter side of the unit is separated from the user's mouth when the speaker in the receiver side of the unit is brought into close contact with the user's ear, which makes it impossible for the user to whisper in communication since such whisper is not sufficiently transmitted to his/her partner in a communication.

In order to compensate for such disadvantages, there is provided a conventional transmitter/receiver unit serving as an externally connected device which is adapted to the cell phone and the like. The conventional transmitter/receiver unit has its microphone separated from its speaker. In use, such conventional unit is mounted on the user's ear or inserted into an acoustic meatus of the user's ear. Due to this, the conventional unit is not used together with the headset and the like. Further, in view of a physical distance between the user's ear to his/her mouth, it is difficult to downsize the conventional transmitter/receiver unit. Further, in such downsizing, there are many restrictions on the configuration of the conventional transmitter/receiver unit. Still further, in the conventional transmitter/receiver unit, since its microphone is separated from its speaker, the conventional unit is poor in portability and in fitness. Further, in the conventional unit, it is difficult for its user to immediately answer a phone call.

As described above, the conventional transmitter/receiver unit serving as the externally connected device connected with the cell phone and the like suffers from various disadvantages. Consequently, it is an object of the present invention to solve the above disadvantages by providing a handset, which is small in size, light in weight and excellent in fitness. Further, the handset of the present invention enables a user thereof to easily perceive any voice sound in communication even in a high-noise environment, and also enables the user to speak in a whisper without making the people around the user uncomfortable. Still further, it is possible for the user of the handset of the present invention to communicate with his/her partner in a communication while enjoying music and the like through a headset and the like. The handset of the present invention is capable of also serving as a personal ornament.

SUMMARY OF THE INVENTION

The present invention resides in a handset using a bone conduction speaker, the handset comprising: a bone conduction speaker portion; a microphone portion; and, a drive circuit storage portion, wherein the handset is capable of being connected with a telephone set or a radio communication unit, wherein the bone conduction speaker is so arranged as to be capable of abutting against an arbitrary area of a user's face when the microphone portion is disposed adjacent to the user's mouth.

A finger-mounted portion assuming a cap-like configuration or a finger ring-like configuration may be provided in the bone conduction speaker portion and/or the microphone portion. Further, the bone conduction speaker portion, the microphone portion and the drive circuit storage portion may be coated with a decorative exterior member.

BEST MODE FOR CARRYING OUT THE INVENTION

Figure 1:
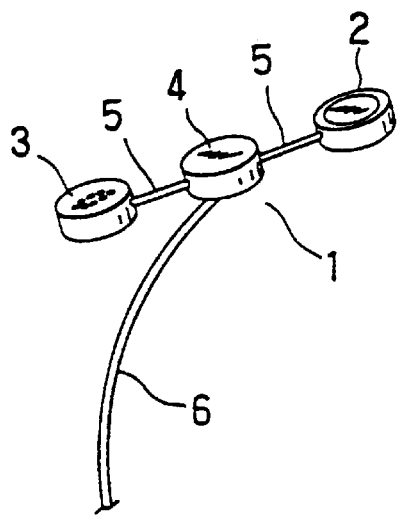
FIG. 1 is a perspective view of an embodiment of the present invention.

With reference to the accompanying drawings, embodiments of the present invention will be described. As shown in FIG. 1, a handset 1 of the present invention using a bone conduction speaker is constructed of: a bone conduction speaker portion 2 constructed of a bone conduction speaker; a microphone portion 3, which is usually constructed of a close-talking microphone; a speaker amplifier disposed therebetween; a microphone amplifier; a drive circuit storage portion 4 including a battery (which may be eliminated when power is derived from a main body of the telephone set or of a radio communication unit) and the like; and, connecting portions 5 for mechanically supporting the above individual component portions, the connecting portions 5 being electrically connected with such component portions.

The bone conduction speaker portion 2 functions to transmit a voice sound as a bone-conduction sound, and is brought into close contact with the user's face in the vicinity of his/her ear when used. In most cases, the bone conduction speaker portion 2 is substantially symmetrically arranged with the microphone portion 3 with respect to the drive circuit storage portion 4.

A structural member (shell) of each of the bone conduction speaker portion 2 and the microphone portion 3 is made of resilient flexible materials having an affinity for the user's skin. For example, the flexible materials comprise annealed copper wires, rubber, urethane resins, polyvinyl chloride resins, silicone resins and the like.

In the drawings, 6 denotes a connecting cord for connecting the handset of the present invention with the cell phone, PHS or a main body of a radio communication unit.

Figure 2:
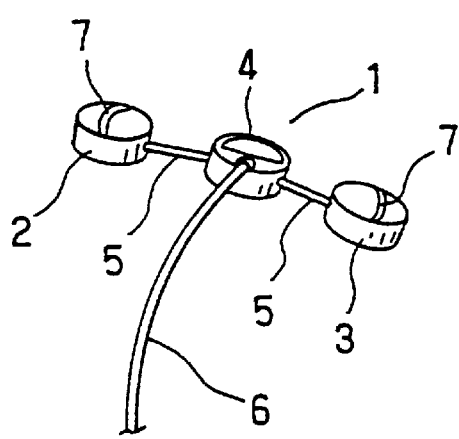
FIG. 2 is a perspective view of another embodiment of the present invention.

In an embodiment shown in FIG. 2, in order to facilitate a mounting and supporting operation of the handset of the present invention on the user's face, a finger-mounted portion 7 assuming a cap-like configuration or a finger ring-like configuration is provided in the bone conduction speaker portion 2 and/or the microphone portion 3. In this case, the user has one or two of his/her fingers inserted into the finger-mounted portions 7, and then has the bone conduction speaker portion 2 brought into slight press contact with his/her forehead, temple, cheekbone, the middle of his/her forehead, or the like to catch a voice sound having been received in a condition in which the user has his/her mouth disposed adjacent to the microphone portion 3 to communicate with his/her partner in a communication.

When the microphone portion 3 is disposed inside the user's palm, it is possible for the user to cover his/her mouth with his/her hand while communicating with his/her partner, which makes it possible for the user to speak in a whisper much smaller in level than that the user uses in one-piece communication units such as a cell phone, a personal handy-phone system, a radio communication unit or the like.

Figure 3:
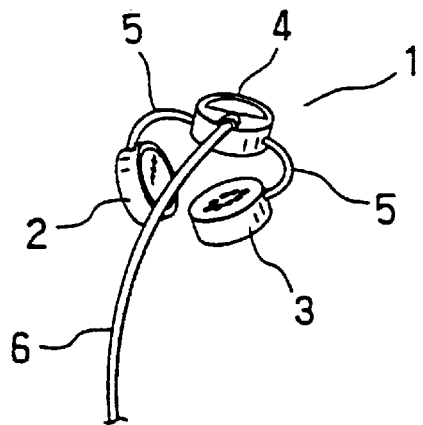
FIG. 3 is a perspective view of further another embodiment of the present invention.

An embodiment shown in FIG. 3 has the connecting portion 5 formed into a C-shaped configuration, which makes it possible for this embodiment to be mounted on the user's wrist in wearing. More specifically, the connecting portion 5 has a moderate resiliency, which makes it possible to resiliently separate the bone conduction speaker portion 2 from the microphone portion 3 when the embodiment is mounted on the user's wrist in an insertion manner. After completion of insertion of the user's wrist into the embodiment, the connecting portion 5 resiliently returns to its substantially initial configuration so that the embodiment is brought into a slight press contact with the user's wrist.

Figure 4A:
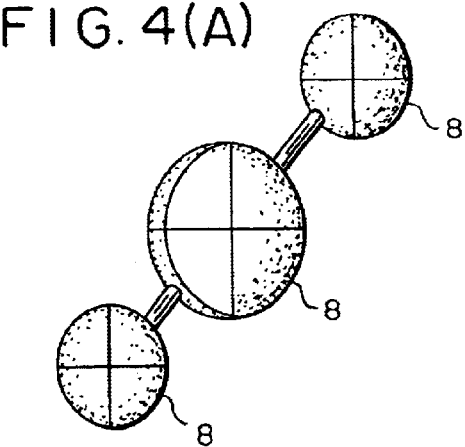
FIGS. 4A–4B are a perspective view of still further another embodiment of the present invention.

Another embodiment shown in FIG. 4 enables the handset 1 to also have personal ornament properties. In this case, each of the above-mentioned components 2 to 4 is coated with each (shown in FIGS. 4 and 5) of external members 8 or coated with an integral external member 9. Preferably, such external members 8, 9 are made of vibration-absorbing materials such as rubber, urethane resins, silicon resins and the like, or formed of such vibration-absorbing materials coated with hard materials such as plastics, metals and the like. Further, the external members 8, 9 are formed into decorative configuration provided with patterns and colors in appearance.

Figure 4B:
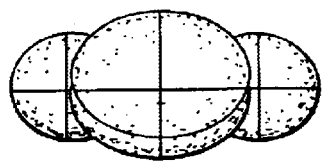
Figure 5:
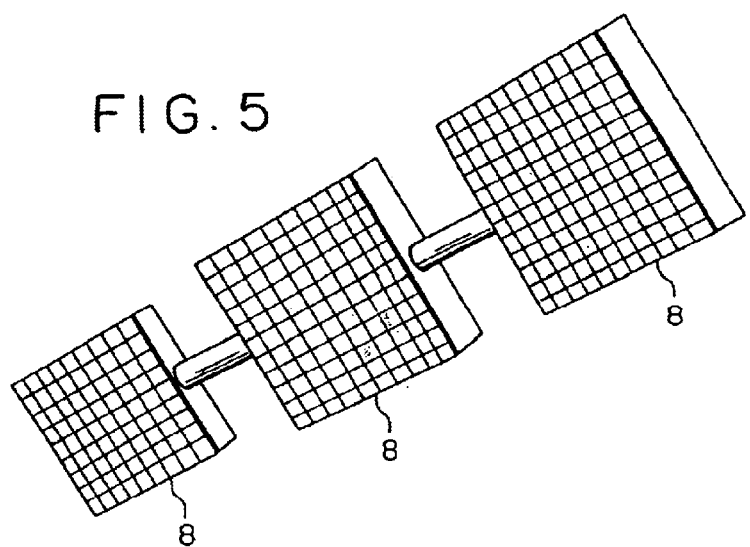
FIG. 5 is a perspective view of another embodiment of the present invention.
Figure 6A:
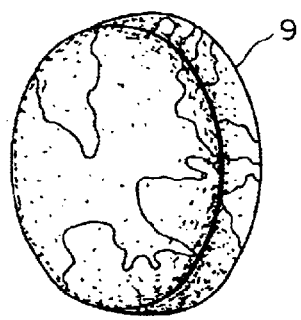
FIGS. 6A–6C are a perspective view of further another embodiment of the present invention.
Figure 6B:
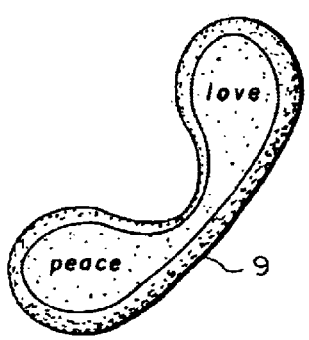
Figure 6C:
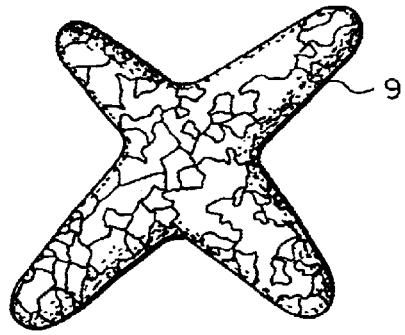

Incidentally, when the individual components 2 to 4 are separately formed, it is possible to gather these components 2 to 4 by withdrawing the connecting portions 5 into the drive circuit storage portion 4 during non-use of the handset 1 in order to save space (see FIG. 4(B)) as a whole.

Further, by forming one or a plurality of the above components 2 to 4 into a clip-like configuration or by mounting a hook and the like on a rear surface of one or a plurality of the components 2 to 4, it is possible to mount the handset 1 as personal ornament on the user's clothes during non-use of the handset 1. In this case, it is possible for the user to immediately answer a phone call and also possible immediately call his/her partner in a communication to the phone.

Industrial Applicability

The present invention having the above construction has the following effects:

1) Since the bone conduction speaker is used in place of an ordinary air-conduction speaker, there is no need the user to have the speaker portion of the handset brought into contact with his/her ear. Due to this, it is possible to freely design the configuration of the handset without considering a distance between the user's mouth and his/her ear;

2) The handset of the present invention enables its user to easily perceive any voice sound in communication even in a high-noise environment, and also enables the user to speak in a whisper without making the people around him/her uncomfortable, wherein such whisper is much smaller in sound level than that he/she uses in one-piece communication units such as a cell phone, a PHS and a radio communication unit;

3) In use, since the speaker portion of the handset is not necessarily disposed in the vicinity of the user's ear, it is possible for the user to communicate with his/her partner in a communication while enjoying music through a headset and the like, for example.

4) It is possible to provide a personal ornament type handset, which is small in size, light in weight, versatile in configuration and excellent in ornamental properties. Consequently, the above-mentioned effects of the present invention are capable of further fueling the demand for the handset and also capable of satisfying the user's taste.

Since the present invention has the above effects, it is possible to further increase the number of the users of the cell phones and the like, which has a large economic effect on the communication industry.

What is claimed is:

1. A handset (1) using a bone conduction speaker, the handset (1) comprising: a bone conduction speaker portion (2); a microphone portion (3); and, a drive circuit storage portion (4), wherein the handset (1) is capable of being connected with a telephone set or a radio communication unit, wherein said bone conduction speaker portion is so arranged as to be capable of abutting against an arbitrary area of a user's face when said microphone portion (3) is disposed adjacent to the user's mouth, wherein said bone conduction speaker portion (2) is symmetrically arranged with said microphone portion (3) with respect to said drive circuit storage portion (4).

2. The handset as set forth in claim 1, wherein said drive circuit storage portion is disposed between said bone conduction speaker portion and said microphone portion.

3. The handset as set forth in claim 1, wherein a structural member of each of said bone conduction speaker and said microphone portion is made of resilient flexible materials.

4. The handset as set forth in claim 1, wherein a finger-mounted portion assuming a cap-like configuration or a finger ring-like configuration is provided in said bone conduction speaker portion and/or in said microphone portion.

5. The handset as set forth in claim 1, wherein said bone conduction speaker portion, said microphone portion and said drive circuit storage portion are coated with a decorative exterior member.

6. The handset as set forth in claim 1, wherein one or more of said bone conduction speaker portion, said microphone portion and said drive circuit storage portion is or are capable of engaging with the user's clothes.

7. The handset as set forth in claim 1, wherein the resilient flexible materials comprise at least one of: annealed copper wires; rubber; urethane resins; polyvinyl chloride resins; and silicone resins.

* * * * *